United States Patent [19]

Harvey et al.

[11] Patent Number: 5,603,281
[45] Date of Patent: Feb. 18, 1997

[54] WATERCRAFT SEAT SUSPENSION

[75] Inventors: John A. Harvey, Sebastian, Fla.; Benoit Renaud, Magog, Canada; Claude Gagnon, Magog, Canada; Pierre Rondeau, Bromont, Canada; Denys Lapointe, Mount Shefford, Canada

[73] Assignee: Bombardier Inc., Montreal, Canada

[21] Appl. No.: 443,881

[22] Filed: May 30, 1995

Related U.S. Application Data

[62] Division of Ser. No. 235,635, Apr. 29, 1994, Pat. No. 5,542,371.

[30] Foreign Application Priority Data

May 4, 1993 [CA] Canada ................................. 2095515

[51] Int. Cl.⁶ ........................................................... B63B 17/00
[52] U.S. Cl. ................................................ 114/363; 114/270
[58] Field of Search ............................... 114/270, 363, 114/188, 194; 440/38, 88; 248/562, 564, 567, 581, 585, 592, 593, 588, 560, 563, 566, 571, 575; 297/208, 209, 213, 326, 328, 195.1, 195.11

[56] References Cited

U.S. PATENT DOCUMENTS

| D. 342,931 | 1/1994 | Mardikian | 114/363 |
|---|---|---|---|
| 2,452,280 | 10/1948 | Zahller | 248/562 |
| 2,707,986 | 5/1955 | Johnson | 248/567 |
| 3,758,064 | 9/1973 | Sawaki | |
| 5,237,950 | 8/1993 | Abe et al. | 114/270 |
| 5,309,861 | 5/1994 | Mardikian | 114/363 |

FOREIGN PATENT DOCUMENTS

| 3908956A1 | 9/1990 | Germany |
| 308892 | 11/1971 | U.S.S.R. |
| WO92/12892 | 8/1992 | WIPO |

*Primary Examiner*—Edwin L. Swinehart
*Attorney, Agent, or Firm*—Fisher, Christen & Sabol

[57] ABSTRACT

In a personal recreational watercraft, an improvement resides in a suspension mechanism, which permits greater maneuverability and stability, and reduces driver fatigue. To overcome the strong forces, a suspension system is employed which permits up and down vertical movement, while resisting lateral movement and torsional forces. The suspension apparatus also reduces shock effects caused by choppy or rough water.

16 Claims, 22 Drawing Sheets

WATERCRAFT SEAT SUSPENSION

This application is a Division of Ser. No. 08/235,635 filed Apr. 29, 1994, now U.S. Pat. No. 5,542,371.

DISCLOSURE

This invention relates to improvements in watercraft, and more particularly, personal watercraft.

BACKGROUND

In the past few years personal watercraft have become increasingly popular. Some types of these personal watercraft are adapted for stand up operation while others are designed to permit the operator to drive the watercraft while in a sitting position. A third group of watercraft permits the operator to operate the craft from either a standing or sitting position.

Recently these watercraft have been developed to be faster and more powerful. There is also a desire on the part of operators to operate the watercraft in choppy or rough waters.

It is, therefore, an object of this invention to produce a watercraft which is more comfortable for an operator, when he negotiates high velocity sharp turns in choppy or rough waters, while at the same time maintaining good stability, maneuverabilty and handling of the craft.

The present invention employs a suspension system which permits the seat, on which the operator sits, to move upwardly or downwardly, depending upon the forces exerted. Forces are present during high velocity turns and in rough and choppy waters.

Various arrangements are possible. In one embodiment the seat itself is capable of upward or downward movement by means of resilient spring damping means and stabilizing bars, commonly known as swing or support arms. The support arms, or stabilizing arms, are generally multi-pivoted structures which permit up and down movement of the seat but resist, reduce, and even eliminate sideways movement.

In another embodiment the seat is fixedly attached to a frame member which is pivoted to the front portion of the watercraft. Support arms or coiled shock absorbers are placed under the seat. Thus, the frame member pivots very slightly at the front while the seat can be constructed to move upwardly or downwardly, any distance, depending upon the configuration, Seat suspensions, according to the present invention, can be designed for either cruising, i.e., to eliminate shock from rough or choppy waters, or finely tuned for tight corners at high velocity speeds.

In another embodiment of the invention, the steering mechanism is also mounted on the pivotal frame member, as is the seat, such that as the seat moves upwardly or downwardly, the steering mechanism moves accordingly, producing better handling for the operator.

In still another embodiment of the invention, a pair of forwardly and outwardly extending frame members are fixedly connected at their rear ends to the front of the seat frame and pivotally attached at their front ends on either side of the deck assembly.

In still another embodiment, not only do the seat and steering mechanisms rise and lower together, but also the footwells on which the operator places his feet, in both the standing and sitting positions. Thus the operator can maintain the same leg, arm and back positions during high speed turns, or riding on rough, choppy waters. By constructing the frame, the steering mechanism, seat and footwells to move upwardly or downwardly simultaneously, the watercraft is much more comfortable.

In a still further embodiment of the invention the upper deck body, which includes the deck, seat, footwells, side decks, bow, and console is integrally molded in one piece. Rather than being fixedly attached to the hull, the upper deck body is connected to the hull by means of a waterproof membrane which encircles the hull and deck. The membrane is flexible and collapsible. The entire upper body of the watercraft is suspended by means of coiled shock spring means, pivotal support arms or telescopic struts, all of which are fastened at their lower ends to the sides or floor of the hull and at their upper ends to the underside of the upper deck body. Thus, when the watercraft encounters choppy water, these configurations create a type of floating suspension which can move vertically up and down such that the operator's seat, footwells, and console all move together.

SUMMARY OF THE INVENTION

Therefore this invention seeks to provide a suspension apparatus for use with a watercraft operator's seat comprising: a resilient spring and damping means and a support arm means, said spring means being adapted to absorb shock, and said support arm means being adapted to resist lateral and torsional movement of said seat when in operation; said spring means and said support means being pivotally mounted at first ends to a hull or deck of said watercraft and at opposite ends to said seat.

The invention further seeks to provide a seat which is fixedly connected to a frame means, the frame means being pivotally connected to a fore portion of the watercraft, the fore portion being fixedly connected to the hull such that in operation when the operator of the watercraft navigates rough water or sharp turns, the suspension apparatus permits the operator's seat to move upwardly or downwardly.

The invention further seeks to provide a suspension apparatus for use with a watercraft operator's seat comprising: a resilient spring means and support arm means; said spring means being adapted to absorb shock and said support arm means being adapted to resist lateral and torsional movement of said seat when in operation; said spring means being pivotally mounted at its first end to a hull or deck of said watercraft and at its opposite end to said seat; and said support arm means being pivotally mounted at one end to a deck or hull frame of said watercraft and being fixedly attached at its other end to said seat.

The invention further seeks to provide a suspension apparatus for use with a watercraft comprising: an integrally molded upper deck body; an integrally molded lower hull body; a flexible collapsible waterproof membrane connecting said hull to said upper deck body; said membrane being fixedly attached to the peripheral upper edges of said hull and the lower peripheral edges of said upper deck body; said upper deck body including a bow deck, side decks, a steering console, an operator's seat, a rear deck and a pair of rear footwells, all of which are integrally molded to one another in fixed relation; said upper deck body being supported in suspended relationship to said hull by at least one resilient spring and damping means and at least one support arm means; and wherein in operation said resilient spring and damping means is adapted to absorb shock while said support arm means is adapted to resist lateral and torsional movement of said upper deck body.

The suspension of a first embodiment of the present invention employs an elongate curvilinear frame which is pivoted to the bow of the watercraft. The frame may consist of a pair of tubular frame members with cross-braces thereon. The seat is mounted on the rear of the frame while the console holding the steering mechanism is mounted on top of the frame approximately midway from the bow to the stern. A control panel is located on the frame between the operator's seat and the console.

Pivotally mounted to the bottom of the watercraft inside the hull, is a coiled spring shock absorber. It is offset from the center line of the hull in order to make room for the drive shaft which is located on the longitudinal axis of the hull. Forward of the offset shock absorber is an H-shaped support arm which is pivotally mounted to the hull of the watercraft and pivotally mounted to the underside of the seat frame. The support arm also has a third pivot point in the middle such that the upper support arm and lower support legs are capable of hinging on each other, as the seat rises or lowers, depending upon forces encountered.

The function of the support arm is to reduce or eliminate any lateral movement of the seat, and to reduce or eliminate sideway torsional forces. Thus, even during sharp turns the seat will move only upwardly or downwardly when subjected to forces. Since the pivotal movement of the front of the frame is minimal, living hinges which comprise pieces of flexible thermal plastics or other materials, can be used to attach it to the bow.

Because the seat moves up and down in relation to the rear deck of the hull, a flexible boot is sealingly attached to the underside of the seat frame and to the top of the rear deck, thus protecting the suspension means and other components from water.

In another embodiment, the footwells are fixedly attached to the seat frame, and flexibly attached to the remainder of the deck by means of a seal such as a flexible boot-type seal. Thus, in operation, as the seat and handlebars rise, so do the footwells, keeping the operator in a constant position.

BRIEF DESCRIPTION OF THE DRAWINGS

A preferred embodiment of the invention is described in conjunction with the following drawings wherein.

DETAILED DESCRIPTION OF THE INVENTION

Figure 1:
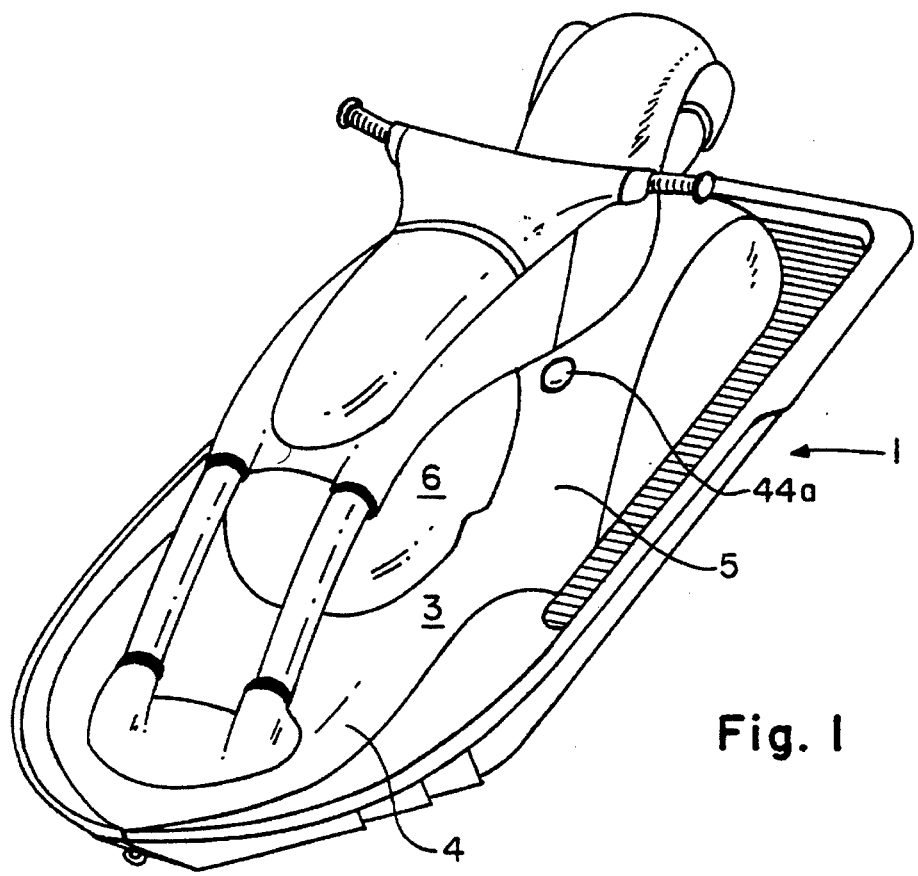
FIG. 1 is a perspective view of the watercraft.

The watercraft of the present invention, shown generally as 1, has an upper body 3, which is sealingly connected to a hull 2. The upper body 3 includes a bow deck 4, and a mid deck 5. This latter deck has an opening for maintenance of the motor which is covered by engine cover 6. The rear deck 10 is raised in the center and near the gunnels on either side of the footwells 7 which surround the raised mid portion of the rear deck 10A. Footwells 7 extend forwardly from the rear of the craft on either side of the raised mid portion 10A. The raised center rear deck portion 10A has two openings therein which serve as maintenance or storage compartments. Compartment 8A (shown in FIG. 7) is covered with the front maintenance cover cap 8. A rear opening is covered by means of rear maintenance cover cap 9.

Figure 3A:
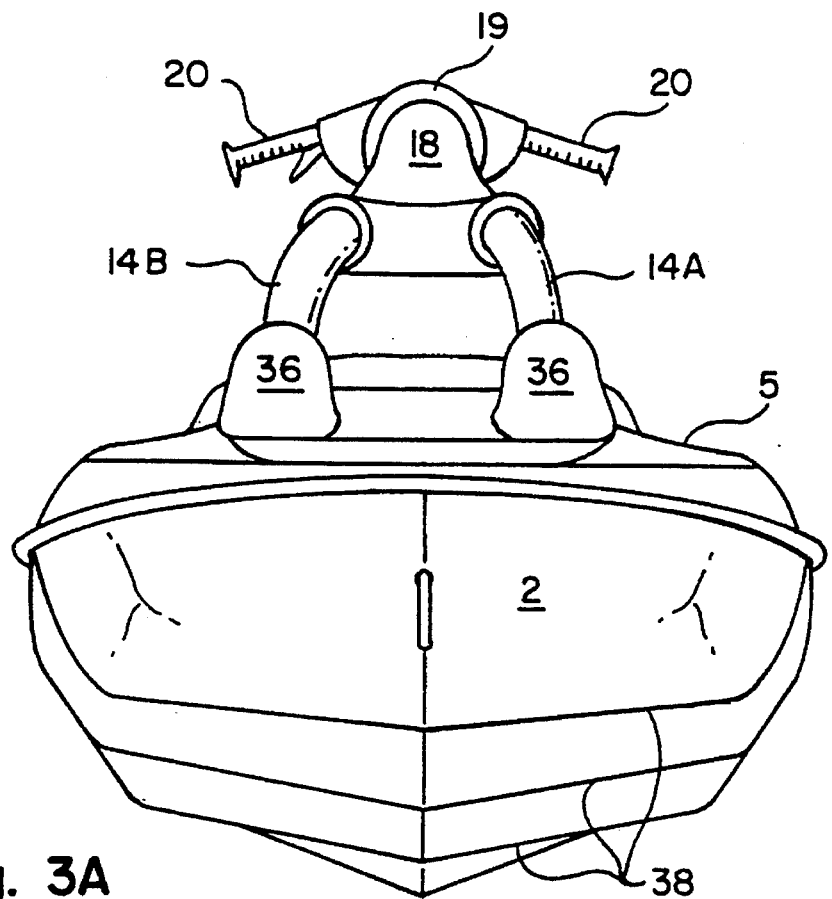
FIG. 3A is a front view of the watercraft.
Figure 4:
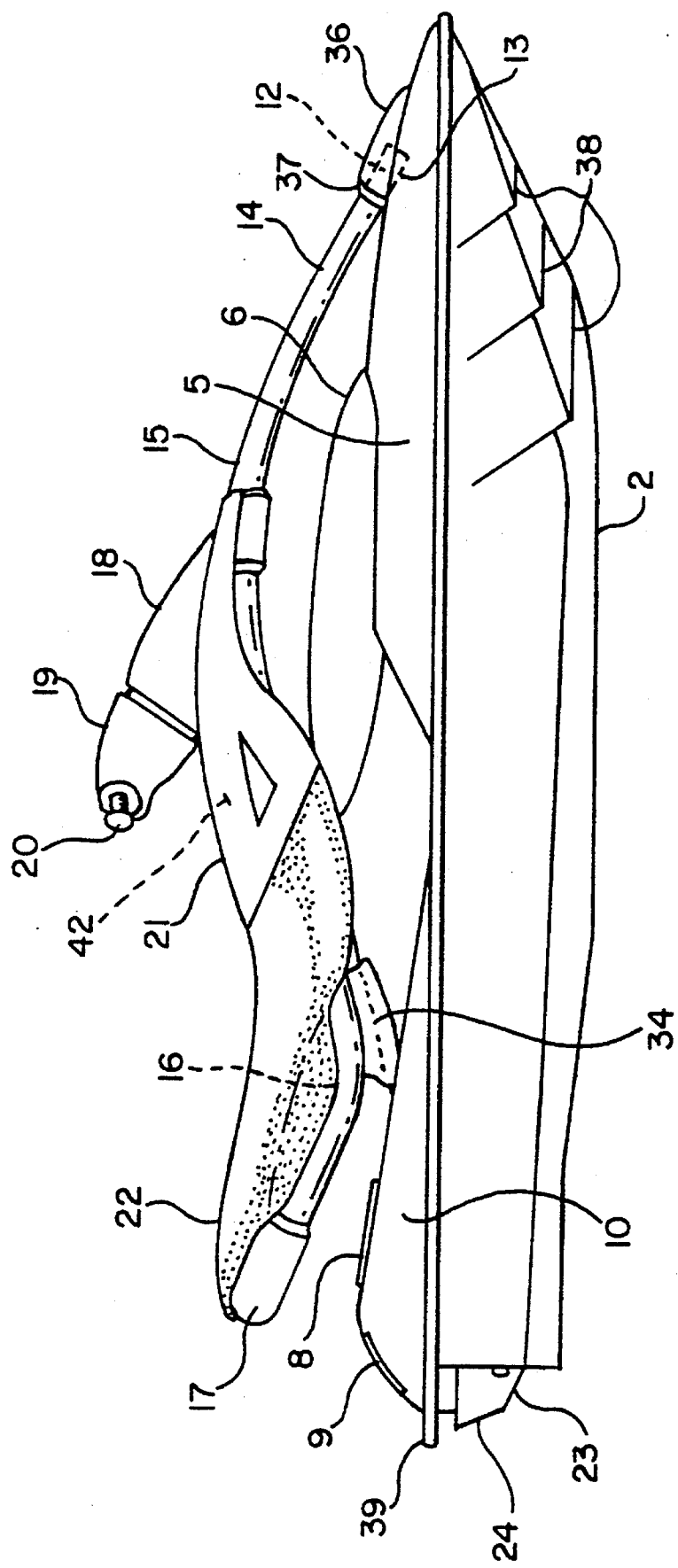
FIG. 4 is a side view of the watercraft.

As seen in FIGS. 3A and 4, a cushion seat 22 is mounted on a pair of elongate frame members 14A and 14B which make up pivoting frame member, shown generally as 14, which is equipped at the fore end with a pair of living hinges 12 which are usually made of flexible elongate planar pieces of thermal plastics, or some other slightly resilient material. Pivot hinges 12 are fixedly attached at one end by means of bolts (not shown) to frame members 14A and 14B and are then bolted at the other end to bow deck 4 at bow hinge plate 13, by means of bolts and nuts (not shown).

The two elongate tubular frame members 14A and 14B extend rearwardly and upwardly from the bow hinge plate 13 until a point marked generally as 15, wherein they begin to curve downwardly and rearwardly, generally to a point shown as 16, and then again extend rearwardly and upwardly to their rear ends which are joined together by curved tubular member 17.

The steering apparatus 19 is mounted to the uppermost portion of frame members 14A and 14B. The steering mechanism is hidden by means of console cover 18. The steering mechanism has a pair of handles 20 attached to a steering column 45, which can be seen in FIG. 6.

The rear of the console cover 18, in a position shown generally as 21, has a control panel 42. Mounted on the rear portion of frame members 14A, 14B is a cushioned seat 22 which is saddle shaped; the lowermost portion of the seat being approximately over the point 16.

Figure 3B:
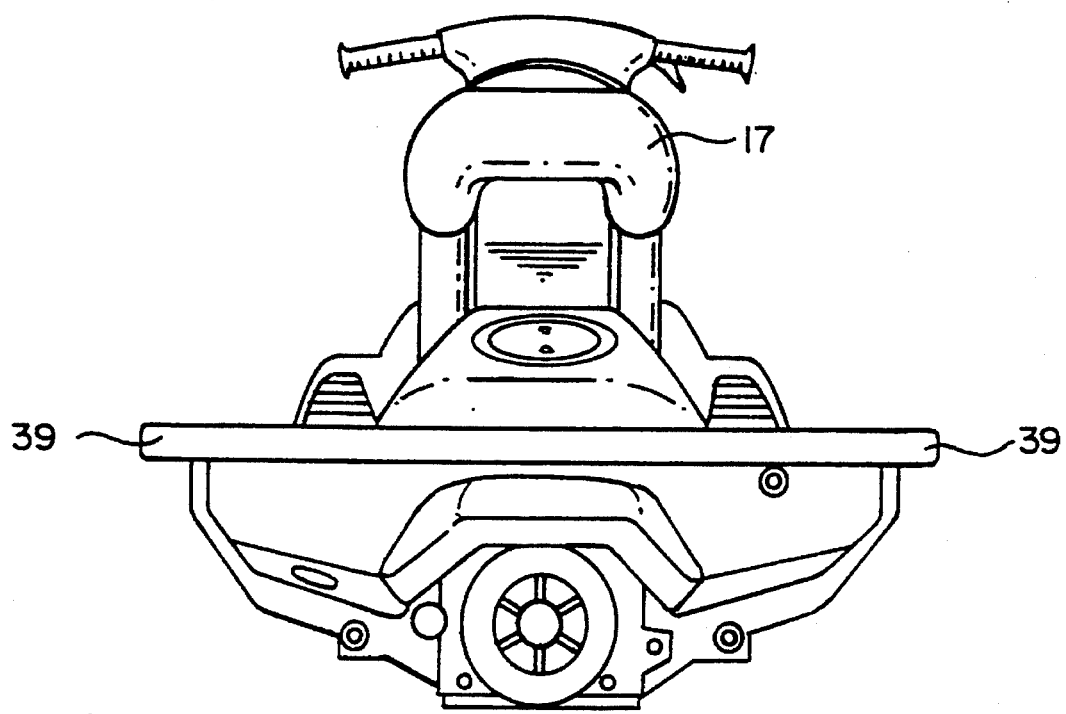
FIG. 3B is a rear view of the watercraft.
Figure 6:
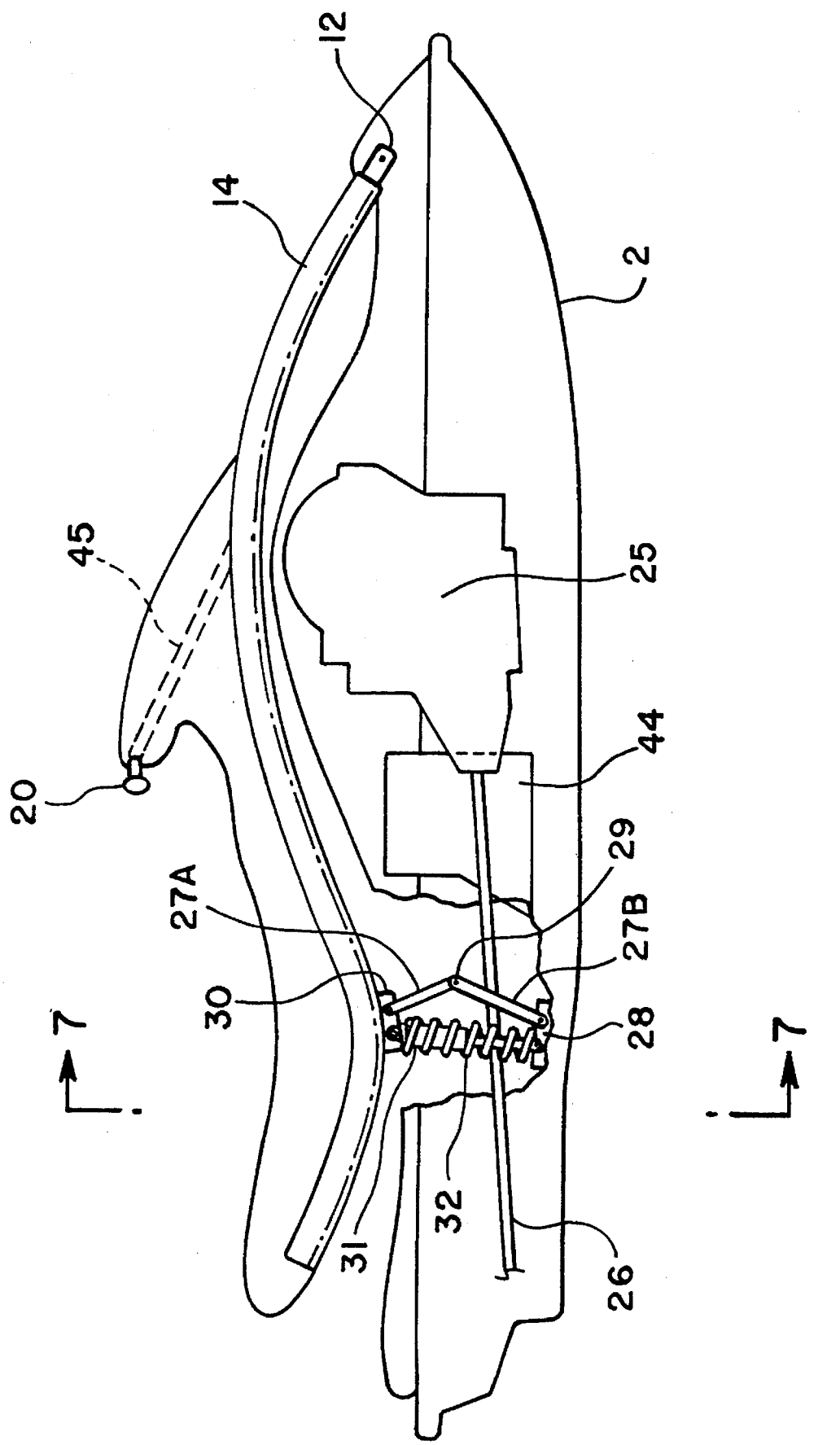
FIG. 6 is a side view partially cut away to expose the suspension of the watercraft.

In both FIGS. 3B and 4, the jet pump 23, which extends outwardly from the rear of hull 2, has an outer nozzle 24. In FIG. 6, if cover 6 is removed, one views motor 25 securely mounted inside the hull on the hull bottom, slightly ahead of steering mechanism 19. Extending from the motor 25 to jet pump 23, is an elongate drive shaft 26.

Figure 7:
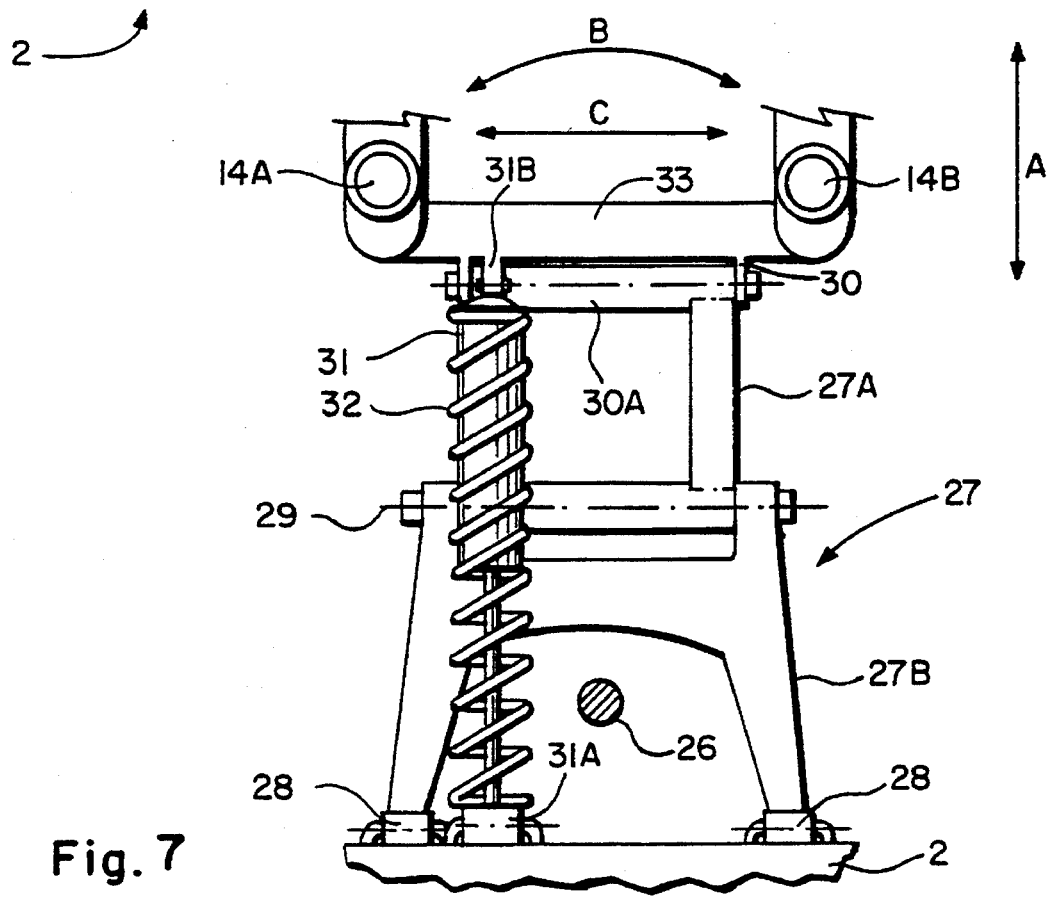
FIG. 7 (which is found on the same drawing page as FIG. 1) is a rear view of the suspension mechanism as seen from section 7—7 of FIG. 6.
Figure 2:
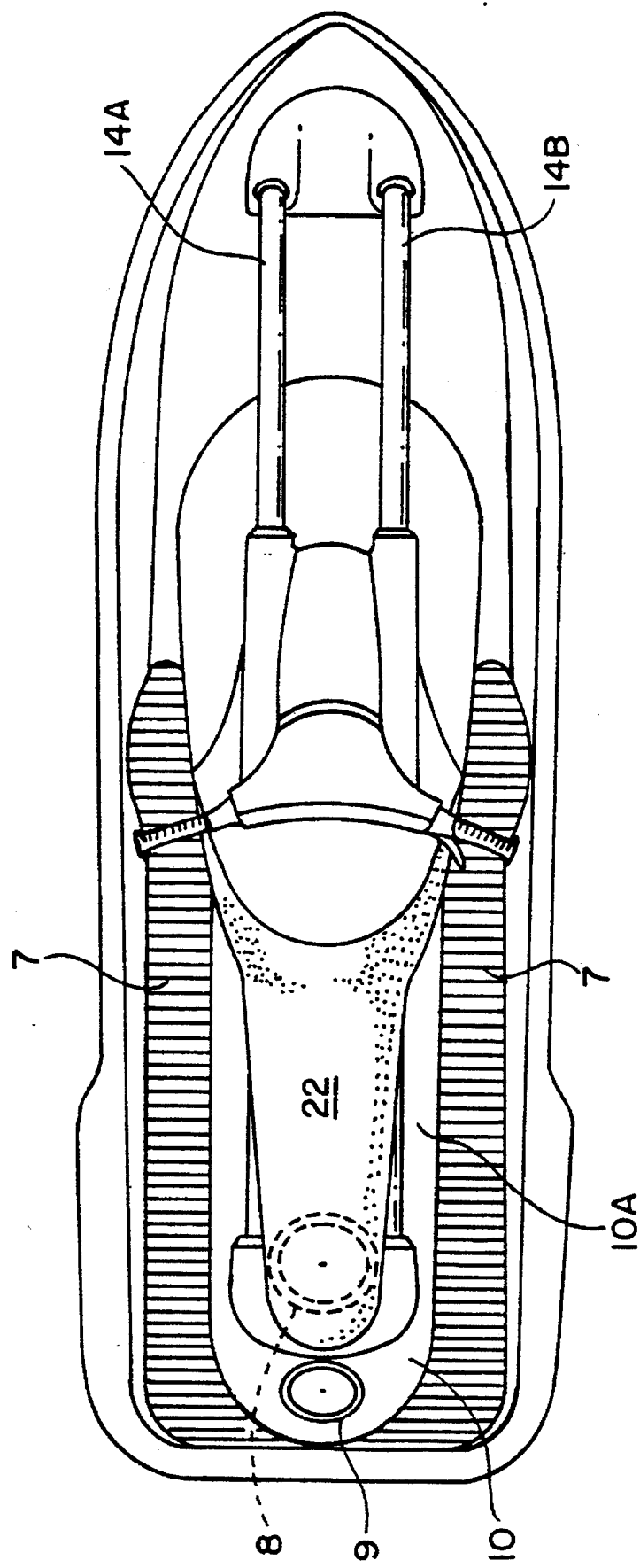
FIG. 2 is a top view of the watercraft.

FIGS. 6 and 7 show the suspension mechanism in detail. The triple jointed swing arm 27 consists of a pair of upper arms 27A and lower arms 27B. When seen from the rear, as shown in FIG. 7, triple jointed swing arm 27 is substantially H-shaped. The triple jointed swing arm 27 is pivotally mounted to the floor of the hull by means of a pair of hull swing arm brackets shown generally as 28. The upper swing arms 27A and lower swing arms 27B are pivotally connected to one another by means of a tubular cross-bar 29.

Connecting frame members 14A and 14B is a transverse cross member 33. Extending downwards from member 33 are a pair of seat frame swing arm pivot brackets 30. Upper swing support arm 27A is equipped with a hollow transverse pivot tube which is adapted to be connected to swing arm pivot brackets 30 by means of bolts and nuts (not shown). Rearwardly of triple jointed swing arm 27 is a shock absorber 31 with a coil spring 32 mounted thereon. Shock absorber 31 is pivotally mounted to bracket 31A on the bottom of hull 2. At its upper end, shock absorber 31 is pivotally mounted to a downwardly extending bracket 31B which is fixedly attached to the underside of frame transverse cross member 33.

In FIG. 7, shock absorber 31 is offset from the center line or longitudinal axis of the hull in order to permit drive shaft 26 to rotate freely. Shock absorber 31 could be placed in any position, either fore or aft of swing arm 27 as long as it does not restrict the movement of drive shaft 26.

Because frame members 14A, 14B are adapted to move upwardly or downwardly, there is a need to seal the opening in rear deck 10 where the shock absorber 31 and triple jointed swing arm 27 rise thereabove to the underside of frame members 14A, 14B. As shown in FIG. 4, a rectangular flexible boot flange 34 is used to ensure a seal which prevents most water from entering into the hull of the watercraft.

Pivot hinges 12 at the front of frame members 14A and 14B are covered by frame pivot covers 36. The connection between frame pivot covers 36 and pivoting frame members 14A and 14B, is sealed with seal 37.

Figure 5:
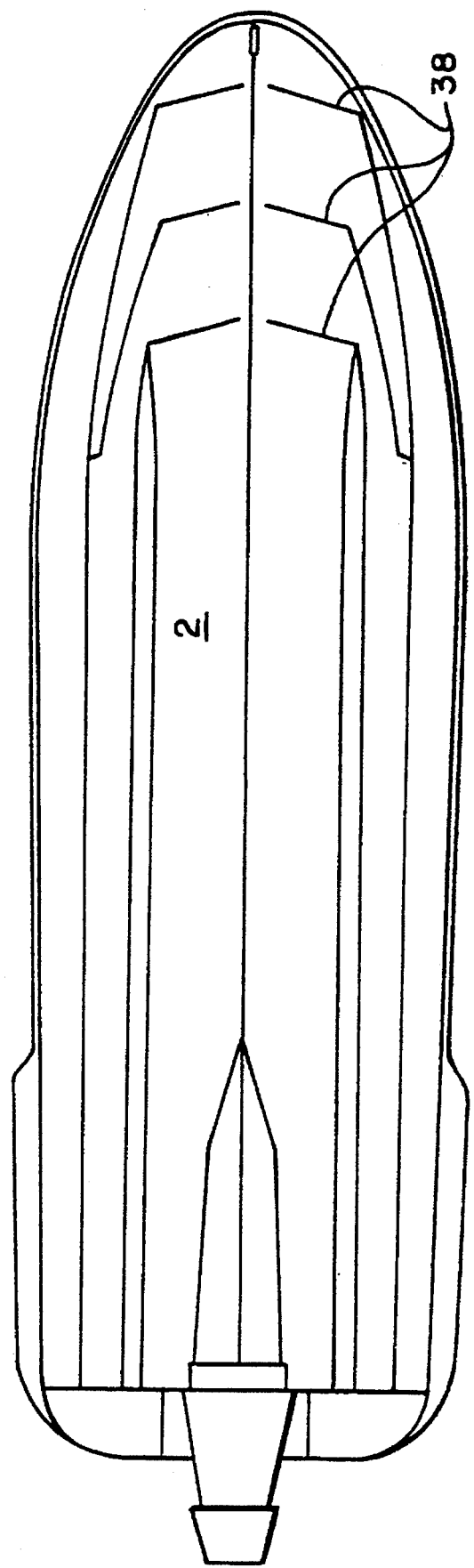
FIG. 5 is a bottom view of the watercraft.

In FIGS. 3A, 4 and 5 the front of the hull on either side of the bow is shown with projections and recesses commonly known as gills and marked as 38.

The hull is also equipped at the rear gunnels with horizontally extending splash boards 39. These are evident in FIG. 3B.

Between tubular frame members 14A and 14B, between console cover 18 and approximately point 16 is an enclosed channel way or guideway (not shown) which functions as a ventilation duct and also a means to connect control cables and wiring from the steering mechanism 19 and control panel 42. The wires and cables (not shown) are directed rearwardly through the ventilation guideway and downwardly into the hull through flexible boot flange 34. As can be seen in FIG. 6, a gas tank 44 is located on the hull bottom near or slightly rearwardly of the center of gravity. A gas tank cover 44a is shown in FIG. 1.

Figure 8:
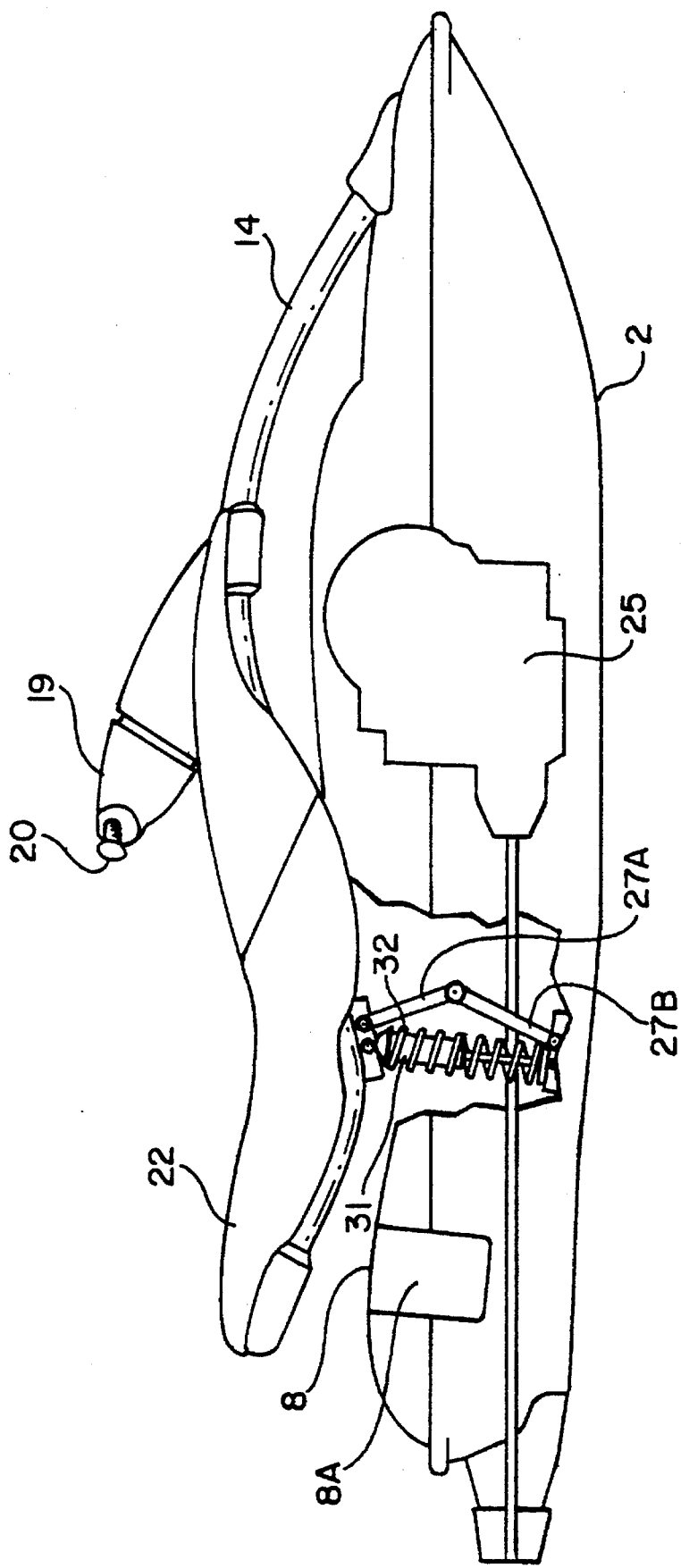
FIG. 8 is a side cut-away view of the watercraft in the normal position.
Figure 9:
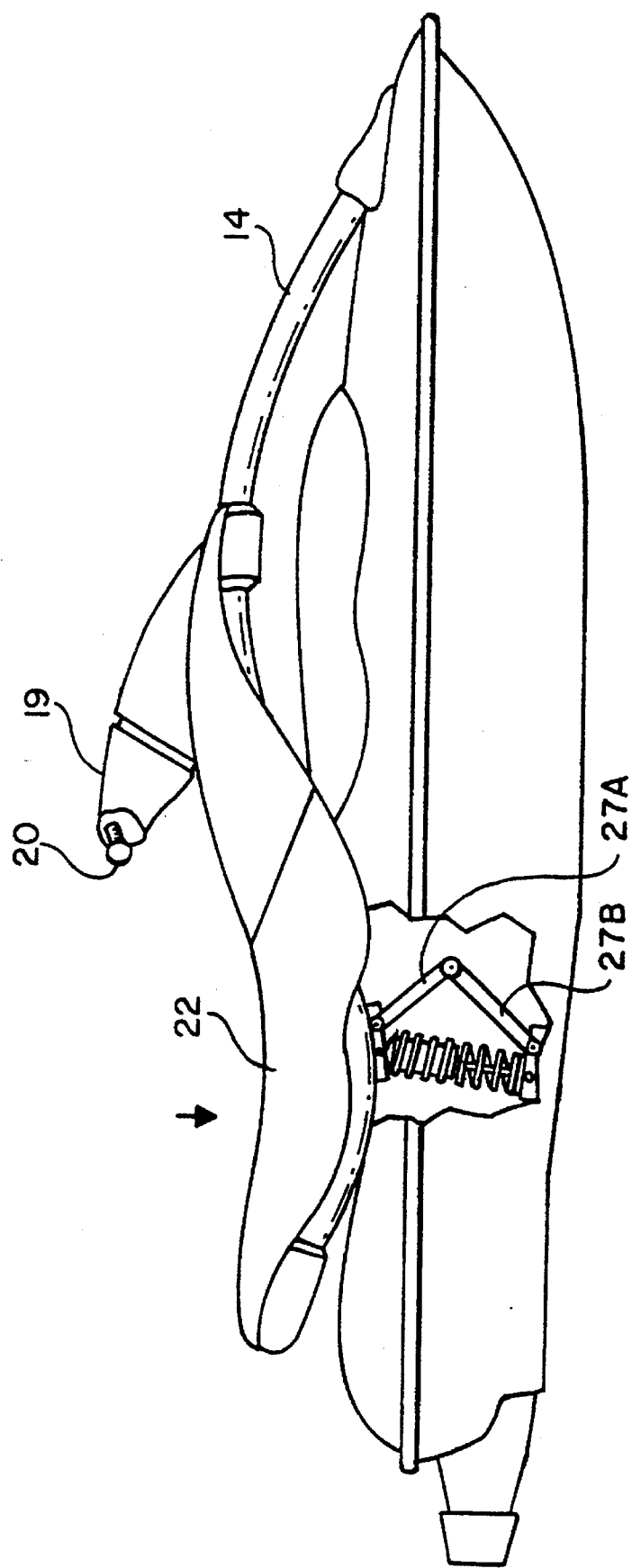
FIG. 9 is a side cut-away view of the watercraft wherein the seat is in the downward compressed position.

The operation of the seat suspension of the present invention is best described using FIGS. 8 and 9. In FIG. 8, the seat 22, the steering mechanism 19, handlebars 20 and frame members 14 are in the upper normal position. This is typical when the watercraft is not negotiating a fast sharp turn or not encountering rough, choppy waters.

However, when the forces are increased due to choppy or rough waters, or the operator moving into a sharp, high velocity turn, the seat 22, frame member 14, and steering mechanism 19, are depressed by the forces to a position shown as FIG. 9. Thus, one can easily view that the angle between upper and lower swing arms 27A and 27B decreases as shock absorber 31 and coil spring 32 are compressed.

In operation, and as more closely shown by FIG. 7, triple jointed swing arm 7 permits movement in the upward and downward direction A but resists torsional movement B and lateral movement C.

Figure 10:
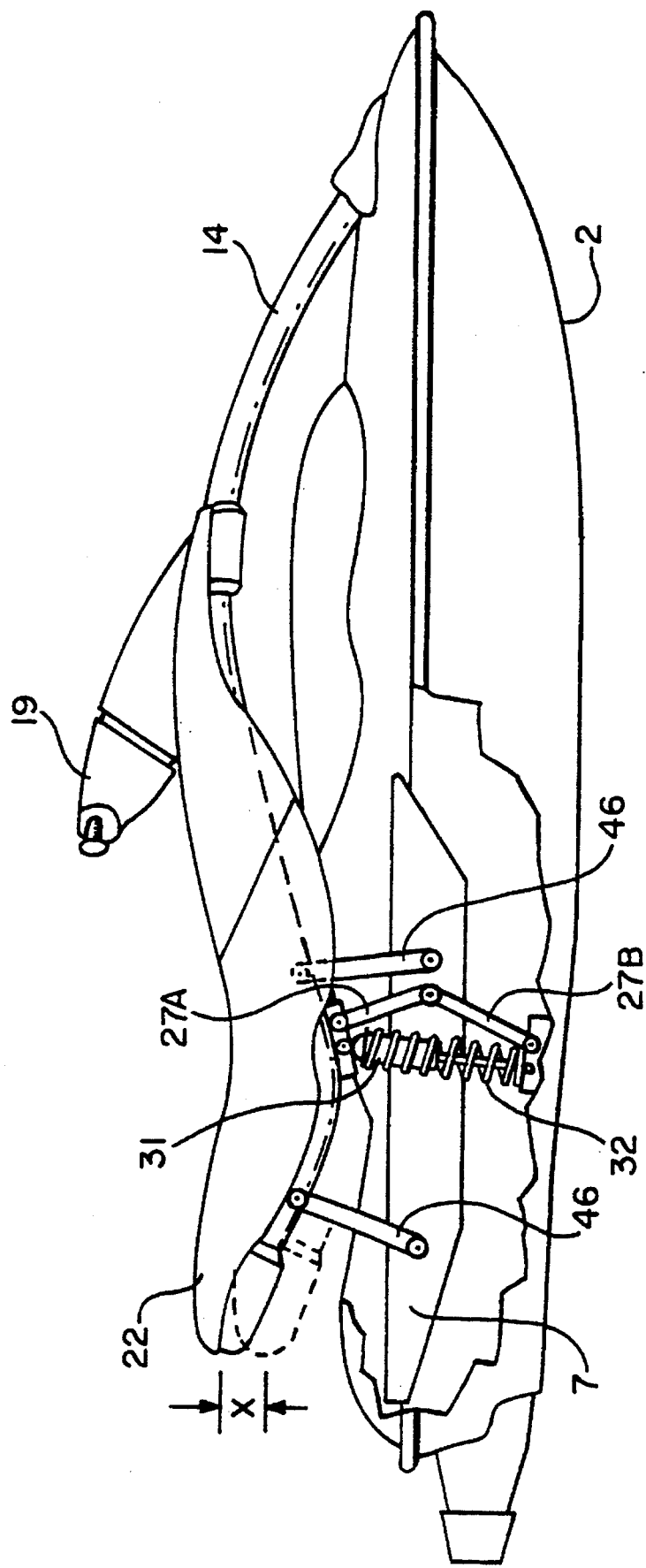
FIG. 10 is a cut-away side view of another embodiment of the invention in the normal operating position.
Figure 11:
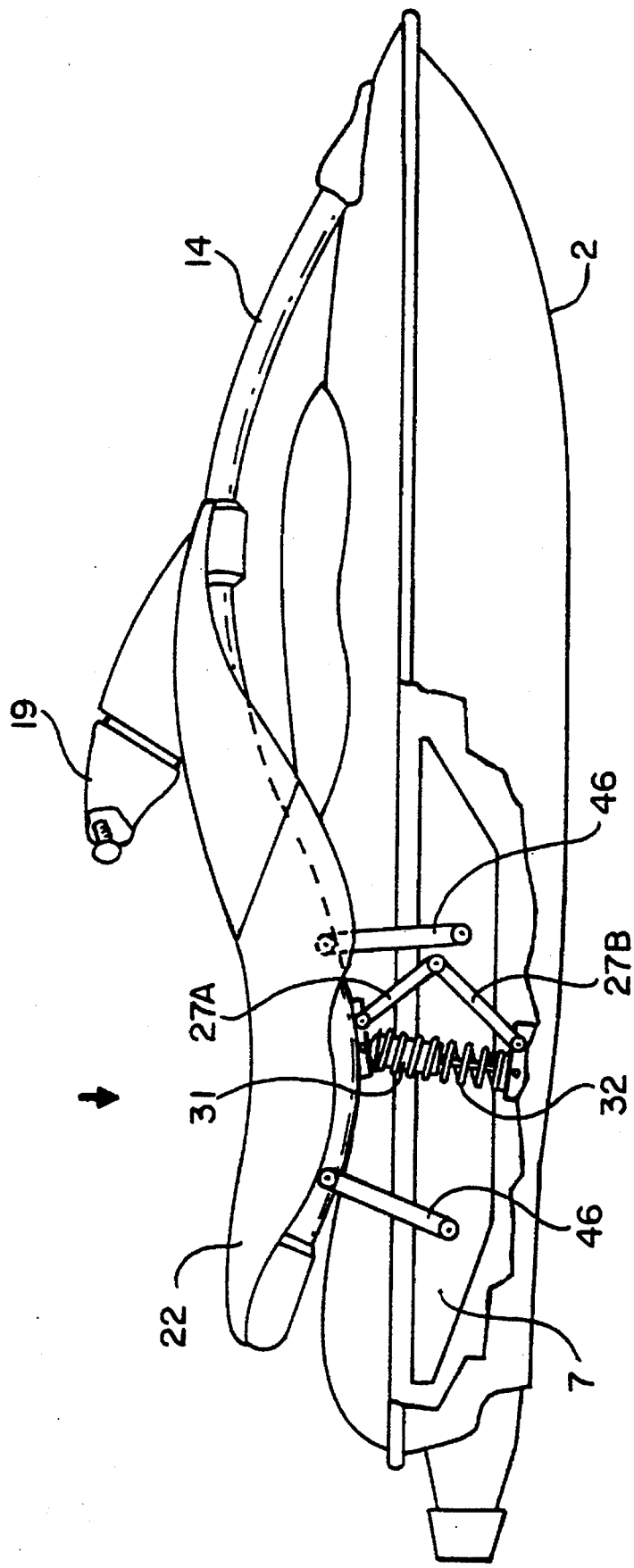
FIG. 11 is a view of the same embodiment wherein the seat is in the compressed position.

FIGS. 10 and 11 show an alternative embodiment of the invention wherein the footwells 7 are fixedly attached to the pivotal frame 14 by means of struts 46. The footwells 7 thus can move upwardly or downwardly with the pivotal frame 14 and the footwells are flexibly connected to the remainder of the body and hull, to allow up and down movement. In FIG. 10 the footwells 7, steering mechanism 19, seat 22, and pivotal frame 14 are in the non-operating normal raised position. In FIG. 11 compression forces have acted upon the seat 22, frame 14, and footwells 7, placing them in the downward position. One views, in FIG. 11, that the angle between upper and lower support arms 27A, 27B is smaller. In FIG. 10, the distance travelled by the seat from the normal position to the fully compressed position is shown as X. When an operator's feet, seat and hands all move upwardly and downwardly simultaneously, there is a reduction of driver fatigue.

Figure 12:
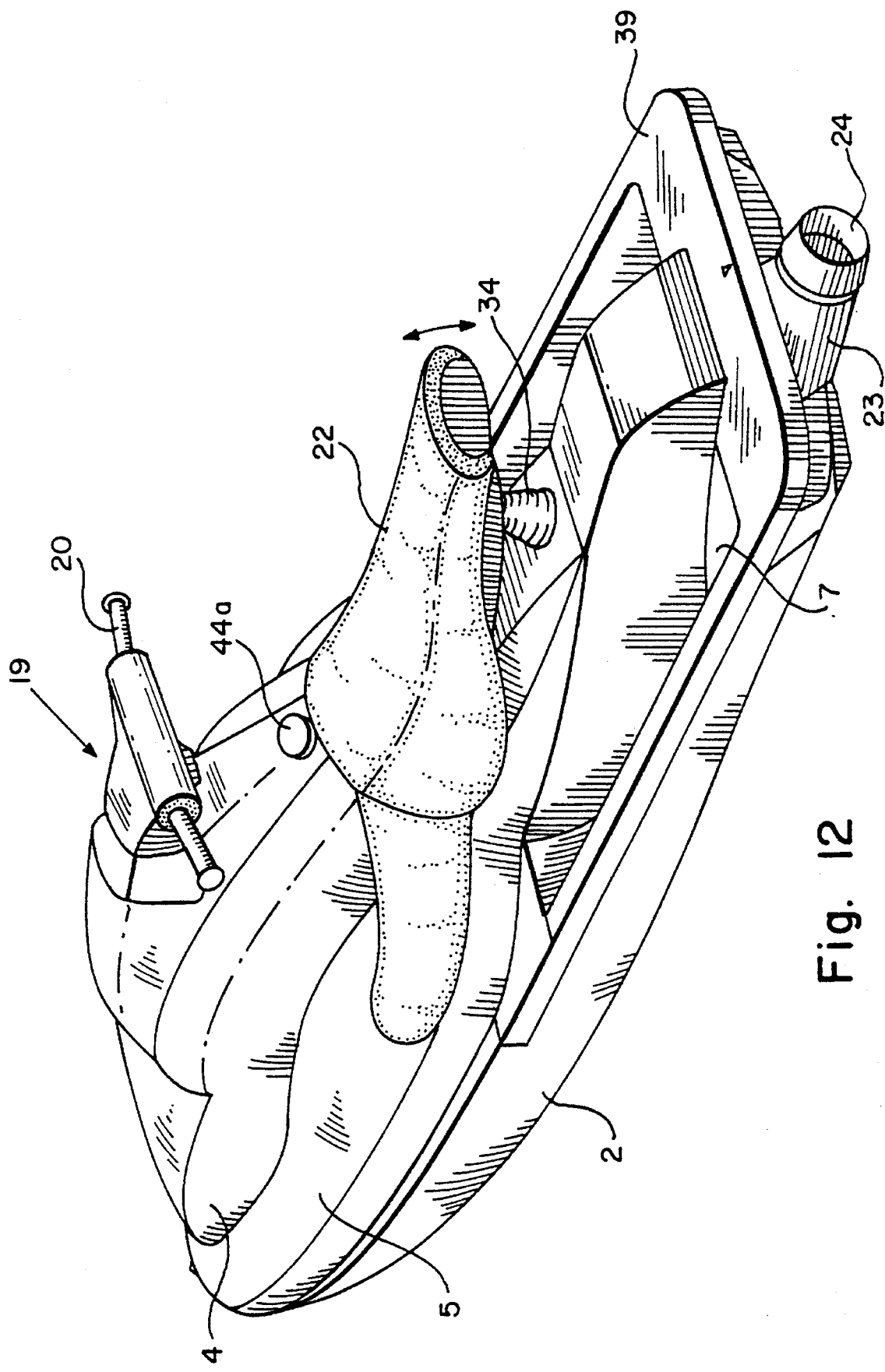
FIG. 12 is a rear perspective view of another embodiment of the invention.
Figure 13:
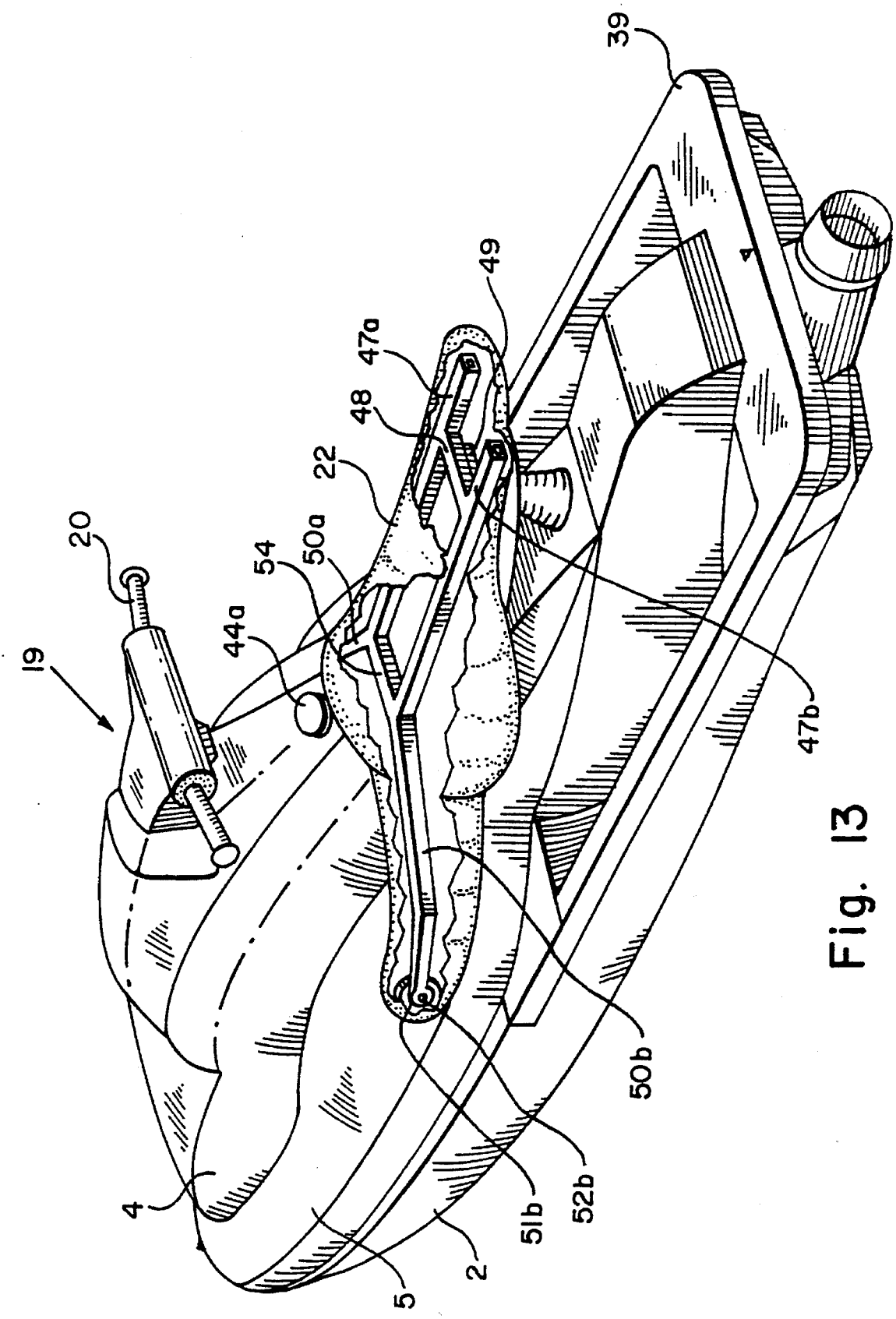
FIG. 13 is a similar view of the same embodiment shown in FIG. 12, with the seat upholstery partially removed.
Figure 14:
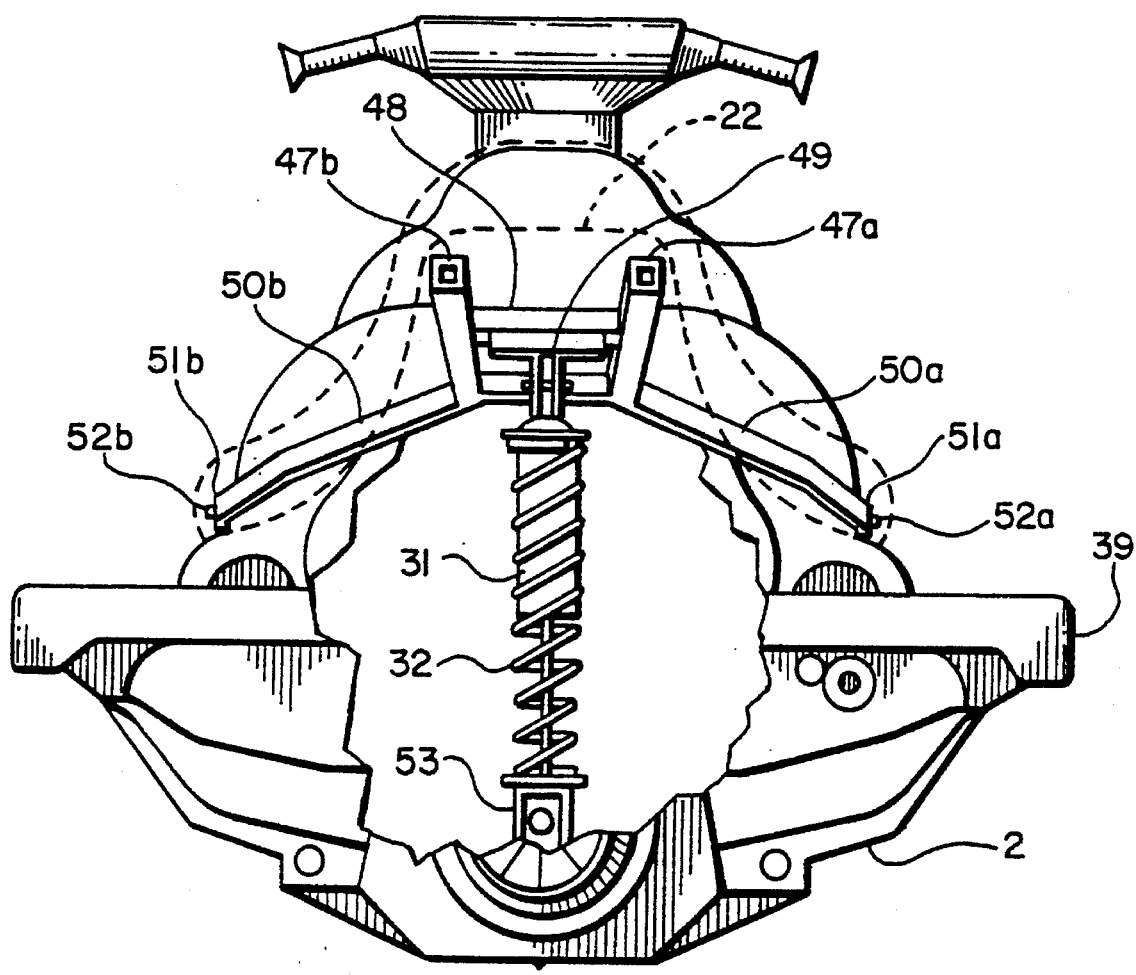
FIG. 14 is a rear cut-away view of the embodiment shown in FIG. 13 with the seat upholstery removed.

In FIGS. 12, 13 and 14 another embodiment of the invention is shown. The operator's seat 22 is supported by a pair of frame members 47a and 47b. Attached to the rear end of frame members 47a and 47b is a cross member 48. Below cross member 48 is pivot bracket 49 which pivotally attaches to the top of shock absorber 31 and coil spring 32. The bottom of shock absorber 31 is pivotally attached to a bracket 53 on the bottom of the hull 2.

Frame members 47a and 47b are attached at their front ends to cross bar 54. Extending forwardly and outwardly to the side of the seat 22 are a pair of support arms having first right and left sections 50a, 50b. These are attached to front right and left sections 51a, 51b of which the ends are pivotally mounted by pins 52a, 52b to the sides of the mid deck 5. In operation, support arms 50b, 51b and 50a, 51a prevent seat 22 from moving laterally while permitting up and down movement of the seat 22 as the shock absorber 31 and spring 32 extend and retract accordingly.

Figure 15:
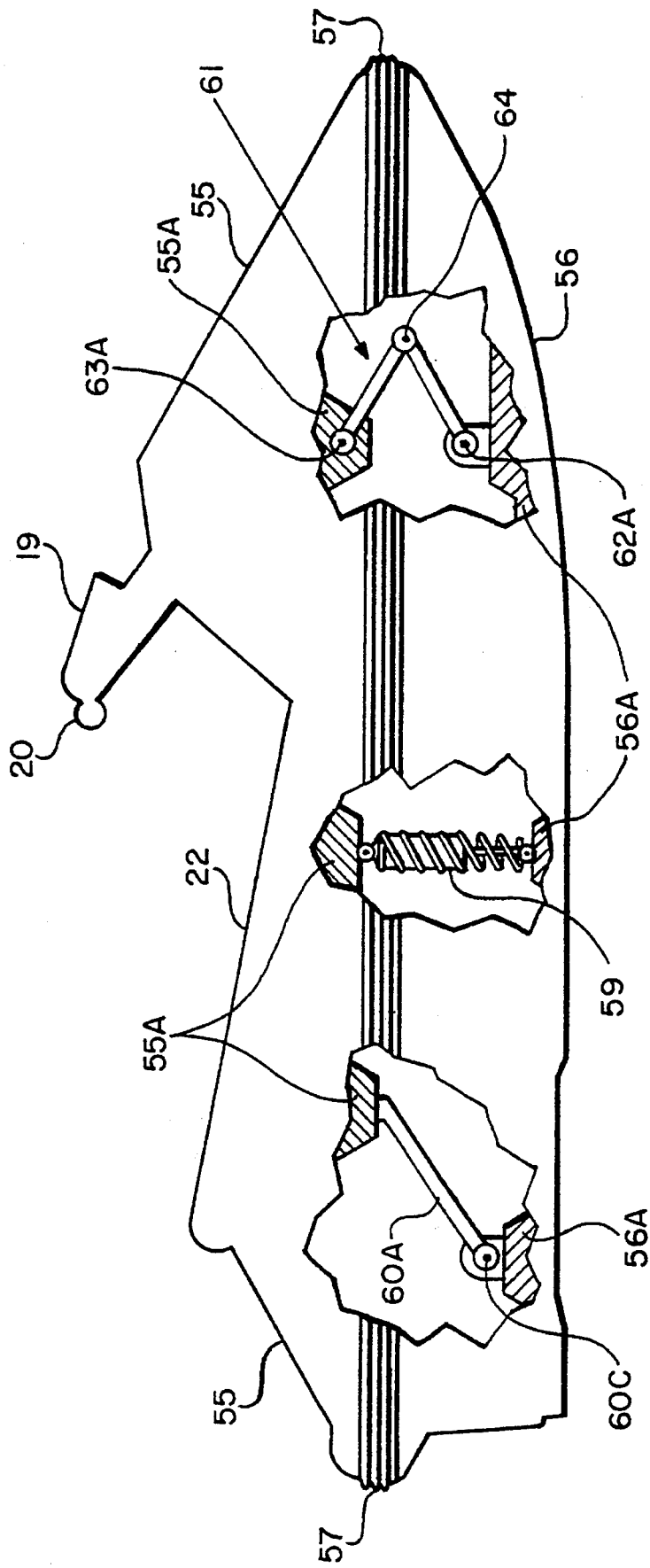
FIG. 15 is a partially cut-away side view of a third embodiment of the invention wherein the hull is connected to the upper body by means of an elastic membrane.

In FIG. 15 a further embodiment of the invention is shown in partially cut-away side view. In this embodiment, not only is the seat 22 in suspension and the console 19 and handlebars 20, but rather the entire upper body deck 55 is suspended above the hull 56, thus the seat, console, bow, sidewalls, rear deck and footwells (not shown in FIG. 15) are suspended.

The upper deck body 55 is integrally molded as one piece including the seat 22 and the console 19. Between the hull 56 and the upper body 55 is a collapsible flexible waterproof membrane 57. This encircles the entire boat, thereby keeping water out of the inside of the boat. The suspension in FIG. 15 uses a coiled shock 59, pivotally mounted to the underside of 55A of the upper deck body and pivotally mounted to the bottom 56A of the hull 56. Forwardly of the coiled shock is an H-shaped support arm shown generally as 61. As the upper deck body 55 rises and falls due to external forces, the support arm 61 is adapted to fold upon itself; thus it is pivoted at 63A, 64, and 62A. The support arm 61 is of similar construction to the support arms shown in earlier embodiments. The H-shaped 3 pivot support arm restricts lateral movement of the upper deck body 55 in relation to the hull 56.

At the rear of the watercraft a pair of single pivot struts 60A,60B are pivotally mounted at 60C and 60D respectively to the floor of the hull 56A (strut 60B and pivot point 60D are not shown in FIG. 15). The upper portion of the strut is fixedly connected to the underside 55A of the upper deck body 55 towards the rear of the seat. In operation, therefore, the bow portion of the upper deck body, the console 19 and the front portion of the seat 22 will move vertically upwardly and downwardly, whereas the rear portion of the seat and deck will move very little when choppy water is encountered.

It is to be understood of course that if it is preferred to have the seat move upwardly and downwardly more than the bow portion of the upper deck body 55, the positions of the single pivot struts 60A and 60B And the H-shaped triple pivot support arm 61 can be reversed.

Figure 16A:
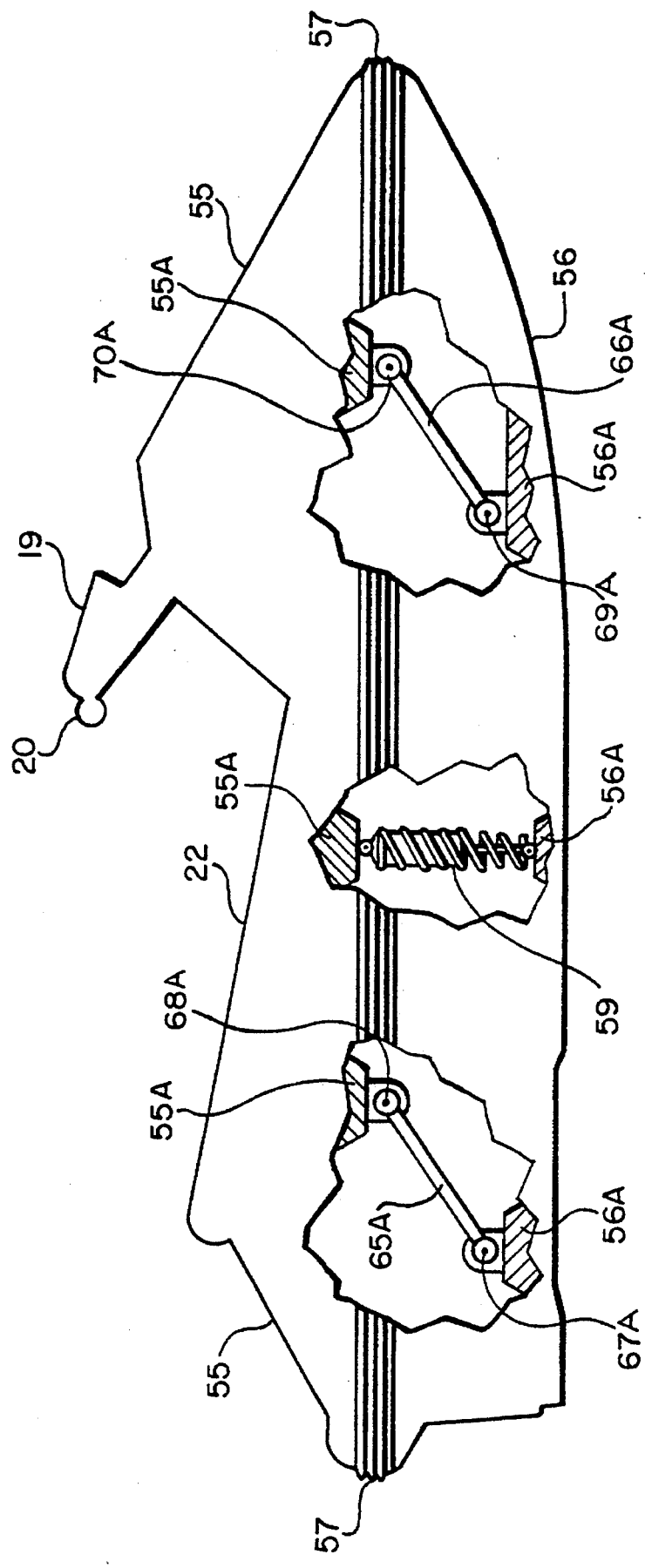
FIG. 16A is a partially cut-away side view of a similar embodiment wherein the support means includes two pairs of double pivoting struts, one pair on either side of a centralized shock absorber.

In FIG. 16A another embodiment of the invention is shown. The coiled shock 59 is again centrally located approximately midway along the length of the boat under the front portion of the seat 22. It is again pivotally mounted to the bottom 56A of the hull 56 and the underside 55A of the upper deck body 55.

Figure 16B:
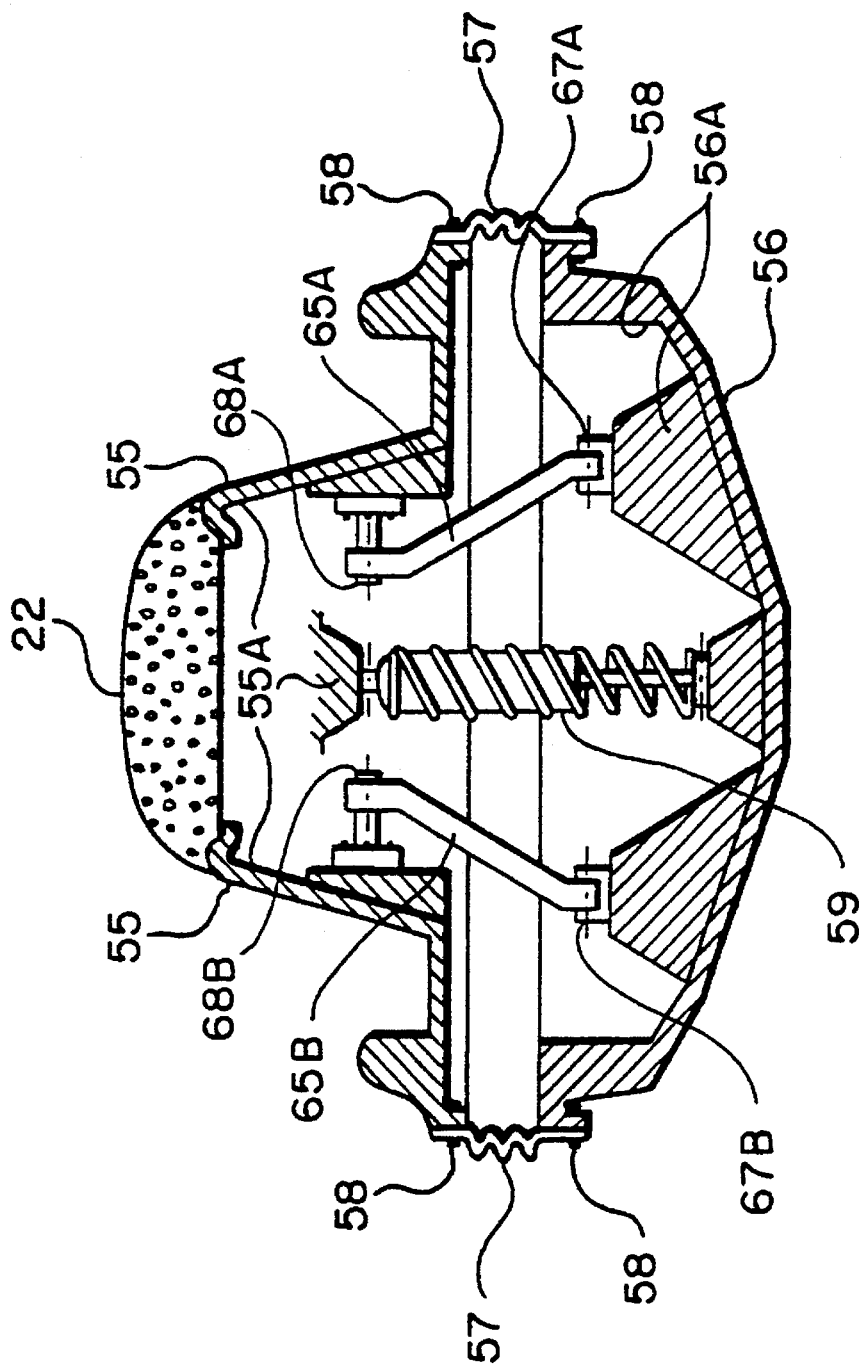
FIG. 16B is a transverse cross-section of the embodiment found in FIG. 16 as seen from the rear.

As shown in FIGS. 16A and 16B, a pair of support arm struts 65A and 65B are pivotally mounted to the floor 56A of the hull 56 at the rear of the boat at pivot points 67A and 67B, respectively. Similarly, two front struts 66A and 66B are pivotally mounted to the underside 55A of the upper deck body 55 at pivot points 70A and 70B, and are pivotally connected at their opposite ends to the floor 56A of the hull 56 at pivot points 69A and 69B.

Thus, as one can readily understand, in the embodiment shown in FIGS. 16A and 16B, when the upper deck body moves downwardly it will also move slightly forwardly and similarly, when downward forces are absent, coiled shock 59 will move upwardly and at the same time the upper deck body 55 will move slightly rearwardly.

It is also apparent in FIG. 16B that the flexible collapsible waterproof membrane 57 is affixed to the sides of upper deck body 55 and the lower hull 56 by means of bolt-type sealed clamps shown generally as 58.

Figure 17A:
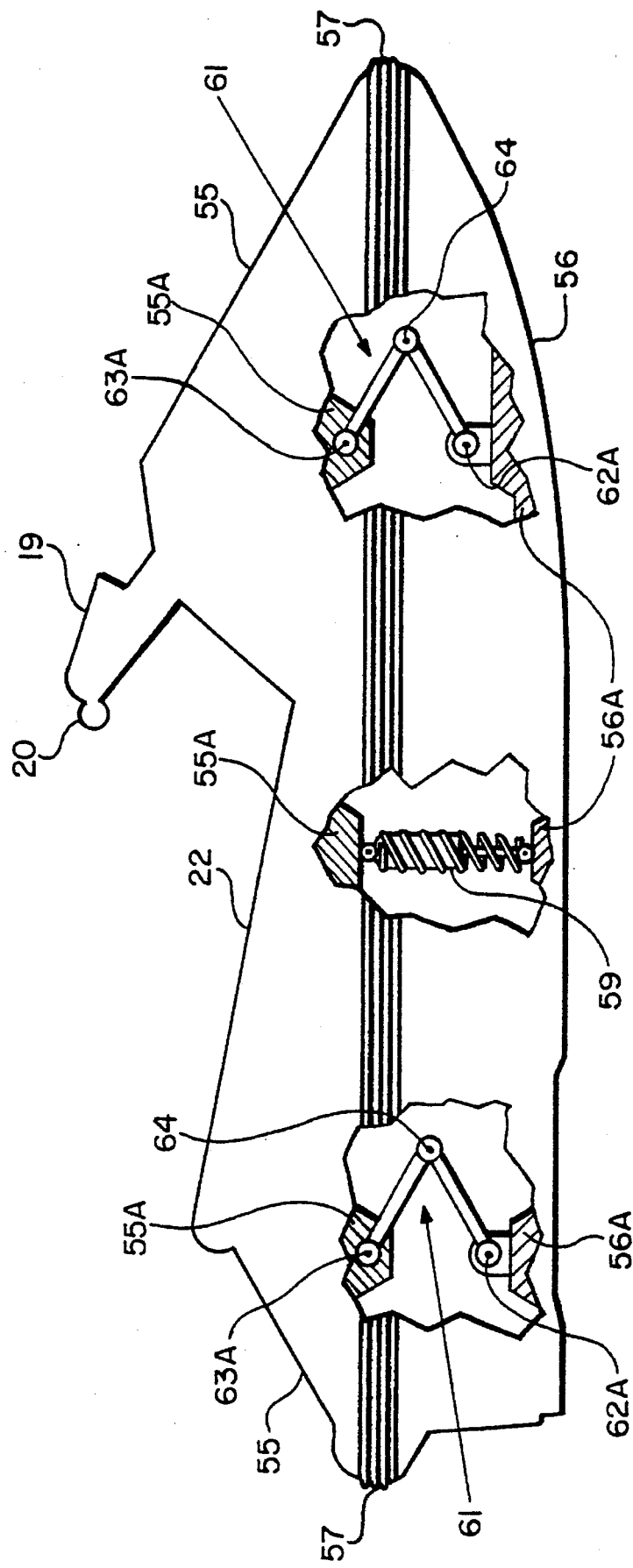
FIG. 17A is a partially cut-away side view of a different embodiment using triple pivot H-shaped swing arms on either side of a centralized shock absorber.
Figure 17B:
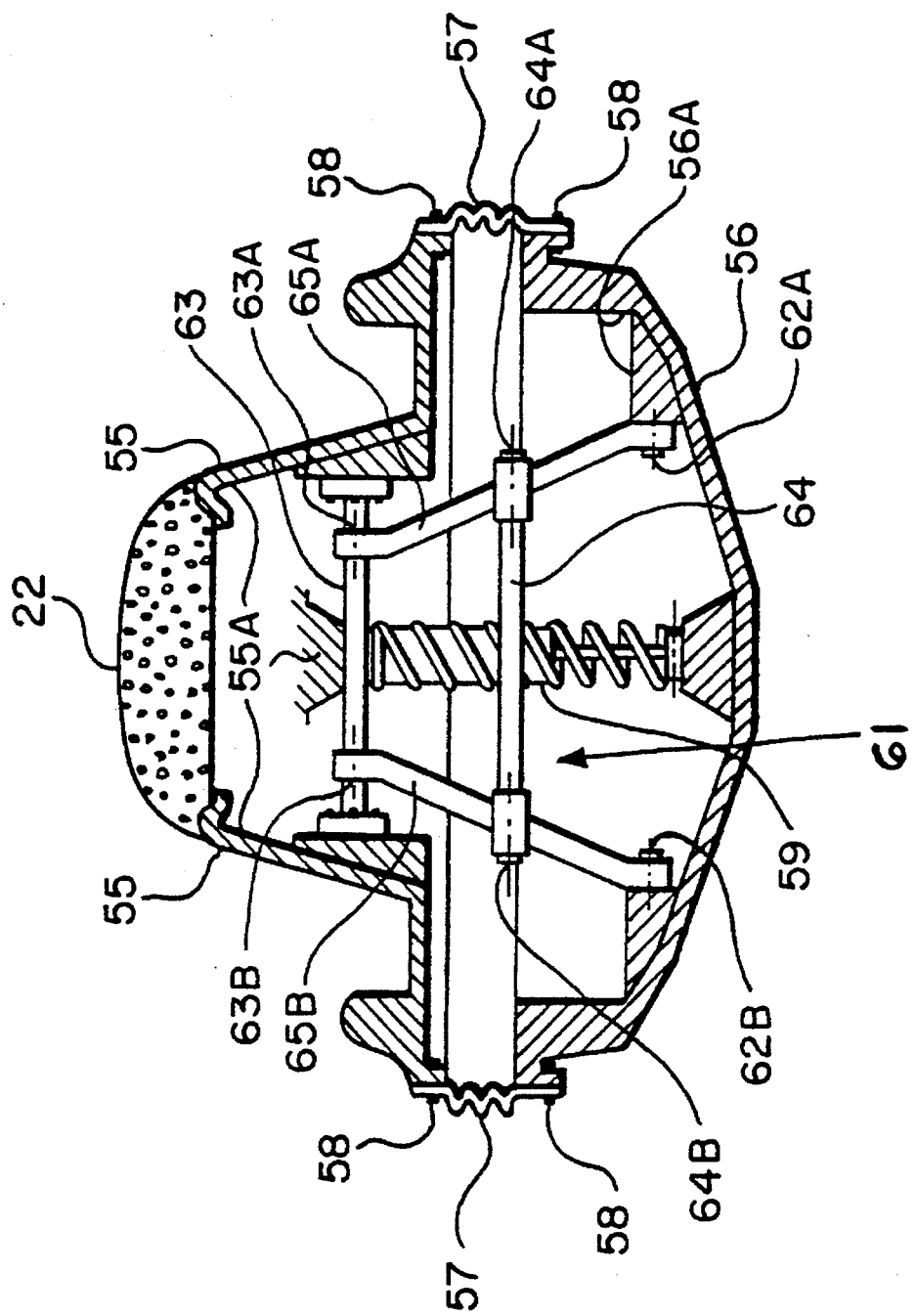
FIG. 17B is a transverse cross-section of FIG. 17A, as seen from the rear.

In FIGS. 17A and 17B, another embodiment of the invention is shown whereby two H-shaped triple pivot support arms 61 are used. One support arm is located under the rear portion of the upper deck body 55 and one is located forwardly of the coiled shock 59, thus supporting the front portion of the upper deck body 55. Again, as shown in the rear view FIG. 17B, the rear H-shaped triple pivot support arm 61 is pivotally mounted to the floor of the hull at 62A and 62B. A central horizontally disposed pivot rod 64 with its perspective pivot points 64A, 64B permits the H-shaped triple pivot support arm 61 to fold upon itself. The H-shaped triple pivot support arm 61 is pivotally mounted to the underside 55A of the upper deck body 55 at 63A and 63B.

Figure 18:
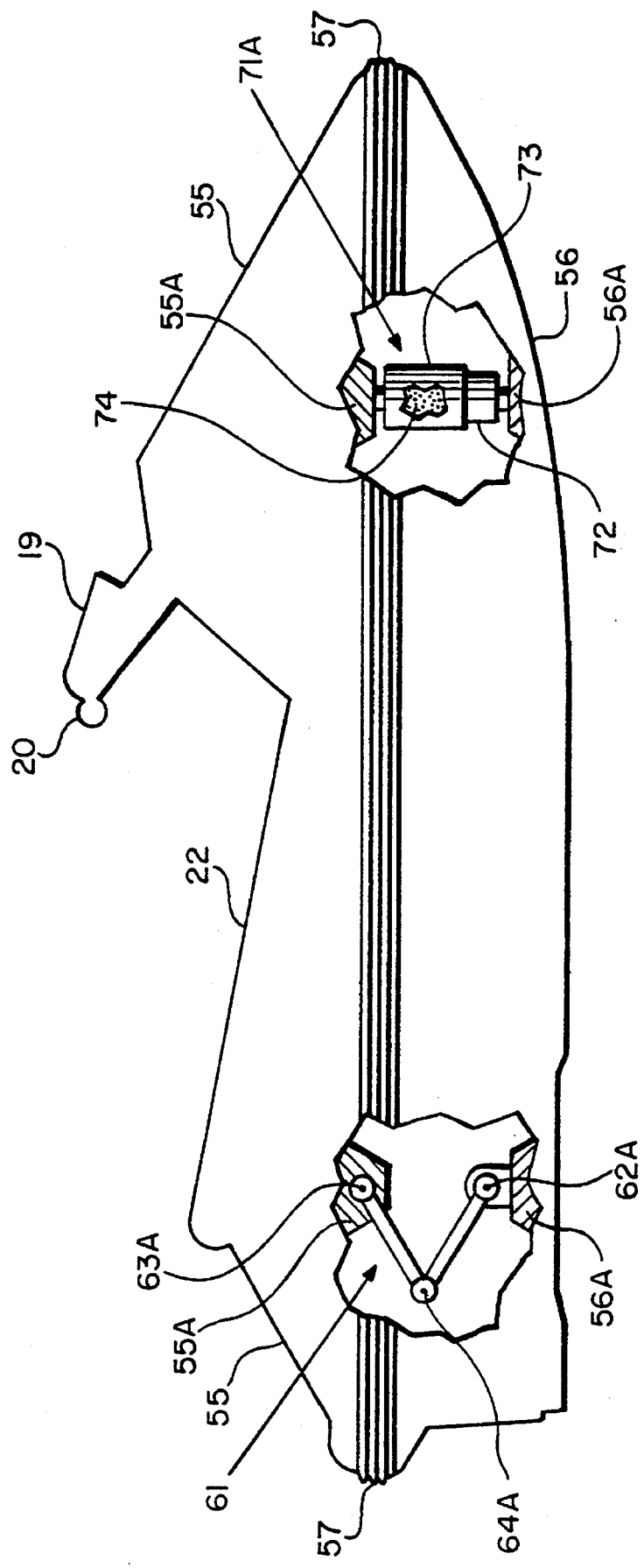
FIG. 18 is a partially cut-away side view of another embodiment of the invention which employs telescoping struts and a triple pivot H-shaped swing arm.

FIG. 18 is another variation of the same embodiment of the invention. Rather than use a single coiled shock absorber 59, a pair of telescoping struts 71A and 71B (note 71B is not visible in FIG. 18), are fixedly mounted both to the floor 56A of the hull 56 and to the underside 55A of the upper deck body 55. The telescoping struts 71A and 71B have a lower sleeve 72 which is capable of sliding upwardly into an upper sleeve 73. Within the telescoping strut 71A is a sealed shock absorber of a known type, shown as 74. Because the telescoping struts 71A and 71B are fixedly mounted to the underside 55A of the upper deck body and the floor 56A of the hull, these telescoping struts not only absorb shock forces but also restrict lateral movement of the upper deck body 55 in relation to the hull 56.

In FIG. 18, an H-shaped three pivotal support arm 61 is mounted in the rear of the watercraft to the underside 55A of upper deck body 55 and the floor 56A of the hull 56, and fastened as previously mentioned.

Figure 19:
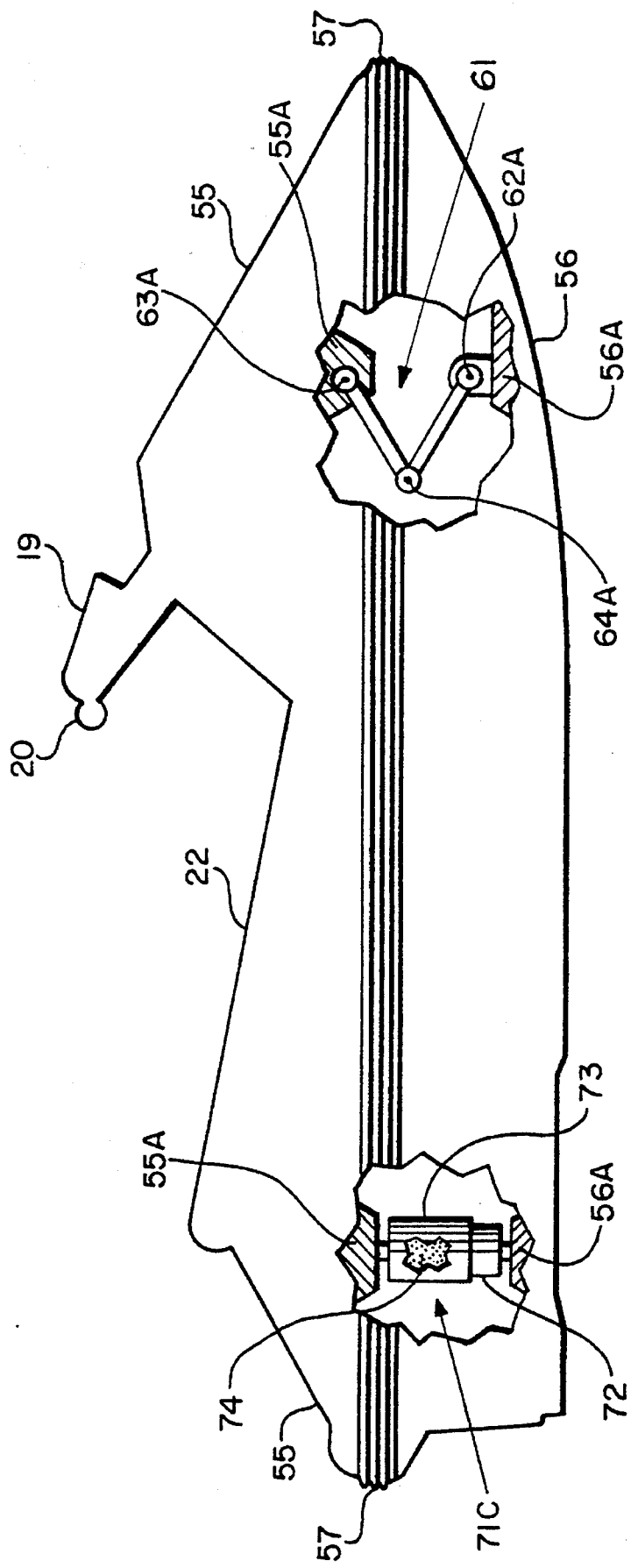
FIG. 19 is a partially cut-away side view of an embodiment which employs two rear telescoping struts and a forwardly mounted H-shaped triple pivot swing arm.

FIG. 19 is similar to the embodiment shown in FIG. 18 with the exception that the telescoping struts 71C and 71D (71D not visible in FIG. 19), are positioned in the rear of the watercraft under the rear portion of the seat 22, and the triple pivot H-shaped support arm 61 is located in the forward portion of the watercraft and pivotally mounted to the floor 56A of the hull 56 and the underside 55A of the upper deck body 55.

Figure 20A:
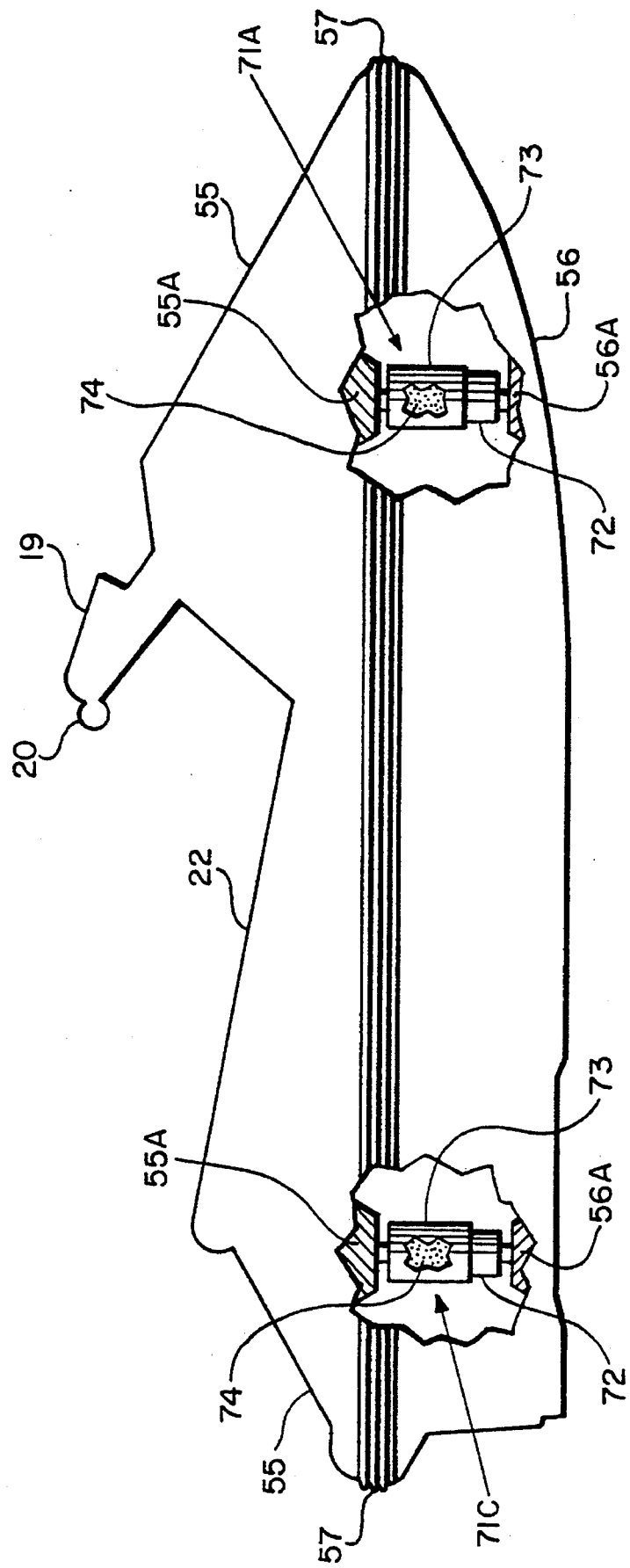
FIG. 20A is a partially cut-away side view of another embodiment of the invention which employs front and rear pairs of telescoping shock struts.
Figure 20B:
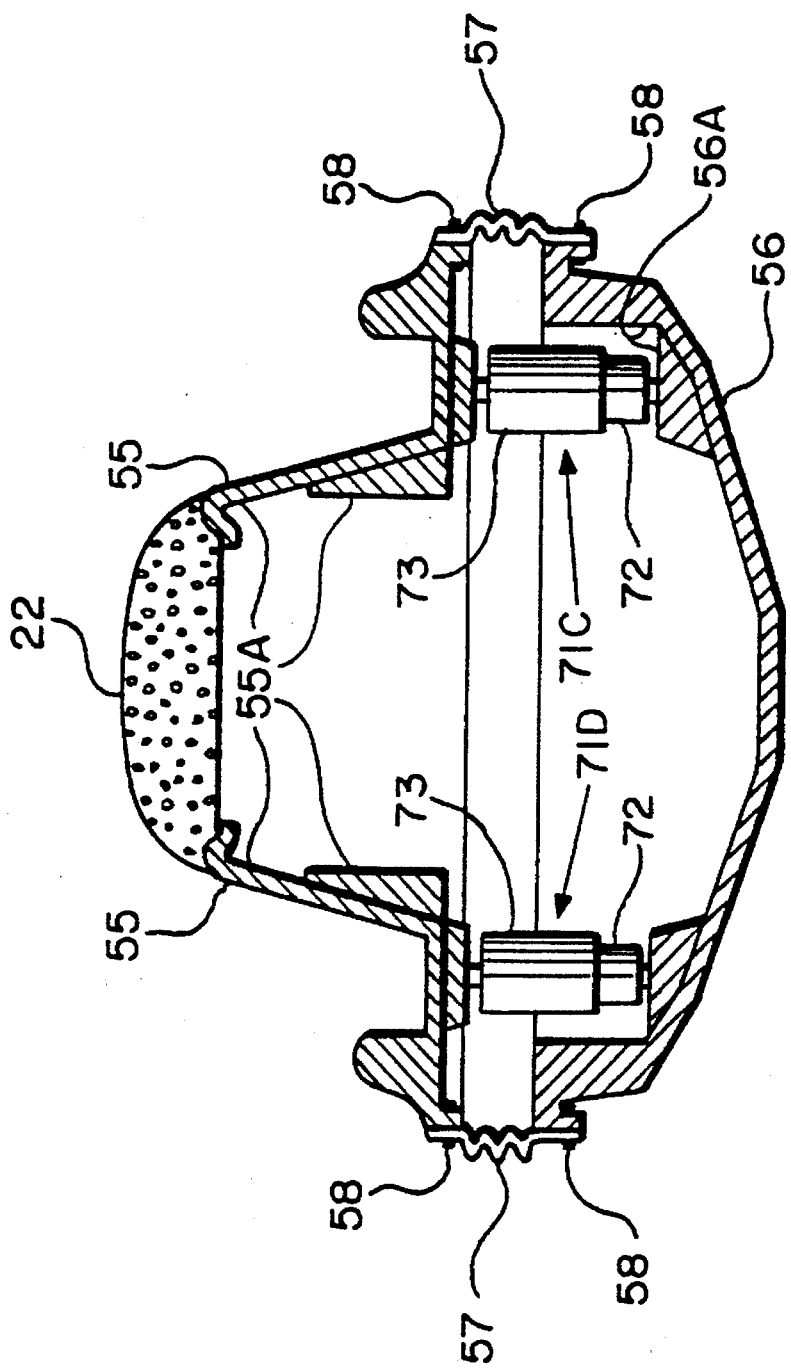
FIG. 20B is a transverse cross-section of FIG. 20A, as seen from the rear.

A final embodiment of the invention is shown in FIGS. 20A and 20B. In this embodiment two pairs of telescoping struts 71A, 71B and 71C, 71D are used to suspend the upper deck body 55 above the hull 56. The four struts are, as before, fixedly mounted to the floor of the hull 56A and the underside 55A of the upper deck body 55. The four telescoping struts effectively replace coiled shocks 59 and triple pivot H-shaped support arms 61 providing the same function, in that the struts not only cushion shock forces with up and down movement but also resist lateral or torsional movement of the upper deck body 55 in relation to the hull 56.

Although specific embodiments of the invention have been described in detail, it is to be understood that any type of seat suspension which reduces forces is encompassed by this invention.

The embodiments of the invention in which an exclusive property or privilege is claimed are defined as follows:

1. A watercraft with a suspended operator's seat comprising:

a resilient spring and damping means and a support arm means, said spring and damping means being adapted to absorb shock, and said support arm means being adapted to resist lateral and torsional movement of said seat when in operation;

each of said spring and damping means and said support arm means being pivotally mounted at their first ends to a hull or deck of said watercraft and at opposite ends to said seat, said seat being fixedly connected to a frame means;

said frame means being pivotally connected to a fore portion of said watercraft;

said fore portion of said watercraft being fixedly connected to said hull;

wherein in operation when said watercraft navigates rough water or sharp turns, said operator's seat is permitted to move upwardly or downwardly, absorbing shock.

2. A watercraft as claimed in claim 1, wherein said frame means comprises:

a pair of elongate frame members;

said frame members being fixedly attached to their rear portions to said seat, and at their front ends, being pivotally mounted to said fore portion of said watercraft.

3. A watercraft as claimed in claim 2, wherein said frame members are tubular, curvilinear and parallel to one another.

4. A watercraft as claimed in claim 1, wherein a steering means is mounted on said frame means, such that when said watercraft is in operation and said seat moves in an upward or downward direction, said steering means moves simultaneously upwardly or downwardly with said seat.

5. A watercraft as claimed in claim 1, wherein said watercraft includes footwells adapted to support the feet of said operator;

said footwells being fixedly connected to said frame means and said seat such that in operation when said seat and said frame means move upwardly or downwardly, said footwells simultaneously move upwardly or downwardly.

6. A watercraft as claimed in claim 1, wherein said resilient spring and damping means comprises a shock absorber with a coiled spring;

an upper end of said shock absorber being pivotally mounted to said frame means and a lower end being pivotally mounted to said hull or deck.

7. A watercraft as claimed in claim 1, wherein said support arm means comprises at least one support arm;

said support arm comprising an upper portion and a lower portion;

said upper and lower portions being pivotally mounted to one another such that in operation as said seat moves upwardly or downwardly, the angle between said upper portion and said lower portion increases or decreases proportionately.

8. A watercraft as claimed in claim 7, wherein said support arm is substantially H-shaped, said upper and lower portions each having a pair of elongate legs;

said elongate legs of said upper and lower portions being connected to one another by a transverse cross member which is substantially horizontal when mounted on said watercraft;

said transverse cross member allowing for angular movement between said two pairs of elongate legs while preventing torsional or lateral movement of said seat and frame means relative to said watercraft.

9. A watercraft as claimed in claim 8, wherein said frame means includes a pair of support arm brackets and a shock absorber bracket on the underside thereof;

said brackets being adapted for pivotal connection to the upper ends of said upper support arm legs and said shock absorber, respectively.

10. A watercraft as claimed in claim 3, wherein the foremost ends of said frame members are pivotally connected to an upper fore deck of said watercraft by means of flexible plastic hinge members.

11. A watercraft as claimed in claim 4, wherein said steering means includes a rearwardly and upwardly extending steering column, and a pair of handle bars fixedly attached thereto;

said steering column being mounted for rotational movement in a steering column bracket;

said steering column bracket being transversely fixedly mounted on said pair of tubular frame members.

12. A watercraft with a suspended operator's seat comprising:

a resilient spring and damping means and a support arm means, said spring and damping means being adapted to absorb shock, and said support arm means being adapted to resist lateral and torsional movement of said seat when in operation;

each of said spring and damping means and said support arm means being pivotally mounted at their first ends to a hull or deck of said watercraft and at opposite ends to said seat, wherein a lower end of said spring and damping means is pivotally connected to the hull at a location which is offset from the longitudinal axis of said hull to permit free rotation of a drive shaft which extends below said seat and between lower support arms of said support arm means.

13. A watercraft as claimed in claim 12, wherein said shock absorber is located rearwardly of said support arm.

14. A watercraft as claimed in claim 12 wherein a gas tank is located on said hull near or slightly rearward of the center of gravity of the watercraft.

15. A watercraft including a suspended operator's seat fixedly mounted to a pair of elongate frame members;

said frame members being hingedly connected at their fore ends to a bow deck of a watercraft;

each of said frame members being connected at its underside rear portion to a bracket for a support arm and a bracket for a coiled spring shock absorber;

said coiled spring shock absorber and said support arm being pivotally connected at their lower ends to brackets mounted on the bottom of a hull of said watercraft, and at their upper ends to said brackets connected to the underside rear portion of each of said frame members, said support arm including a pair of upper support arms and a pair of lower support arms, said pairs of support arms being pivotally interconnected to one another, such that in operation, when forces are applied to said seat, said coiled spring shock absorber compresses and said support arm resists lateral and torsional movement.

16. A watercraft with a suspended operator's seat comprising:

a resilient spring and damping means and support arm means; said spring and damping means being adapted to absorb shock and said support arm means being adapted to resist lateral and torsional movement of said seat when in operation;

said spring and damping means being pivotally mounted at its first end to a hull or deck of said watercraft and at its opposite end to said seat; and said support arm means being pivotally mounted at one end to a deck or hull frame of said watercraft and being fixedly attached at its other end to said seat, wherein said support arm means comprises a pair of forwardly and outwardly extending elongate support members, said pair of support members being fixedly connected to a seat frame at their rear ends and being pivotally attached to each side of a watercraft deck at their forward ends, thereby prohibiting lateral or torsional movement of said seat.

* * * * *